United States Patent
Fujiwara et al.

(10) Patent No.: US 8,885,103 B2
(45) Date of Patent: Nov. 11, 2014

(54) DISPLAY DEVICE AND TELEVISION RECEIVER

(75) Inventors: Kohji Fujiwara, Osaka (JP); Tomohiro Kimura, Osaka (JP); Akiko Miyazaki, Osaka (JP); Toshiharu Kusumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/997,765

(22) PCT Filed: Dec. 26, 2011

(86) PCT No.: PCT/JP2011/080109
§ 371 (c)(1),
(2), (4) Date: Jun. 25, 2013

(87) PCT Pub. No.: WO2012/090953
PCT Pub. Date: Jul. 5, 2012

(65) Prior Publication Data
US 2013/0286287 A1    Oct. 31, 2013

(30) Foreign Application Priority Data

Dec. 28, 2010 (JP) ................................. 2010-294113

(51) Int. Cl.
| | |
|---|---|
| H04N 5/445 | (2011.01) |
| H04N 7/01 | (2006.01) |
| H04N 11/20 | (2006.01) |
| G09G 5/02 | (2006.01) |
| G06F 3/038 | (2013.01) |
| G09G 5/00 | (2006.01) |
| G09G 3/36 | (2006.01) |
| H04N 21/431 | (2011.01) |
| G09G 3/20 | (2006.01) |
| G09G 3/34 | (2006.01) |
| H04N 21/443 | (2011.01) |

(52) U.S. Cl.
CPC ....... *H04N 5/44591* (2013.01); *H04N 21/4316* (2013.01); *G09G 3/20* (2013.01); *G09G 3/3406* (2013.01); *G09G 3/3413* (2013.01); *G09G 3/3426* (2013.01); *G09G 3/3674* (2013.01); *G09G 3/3685* (2013.01); *H04N 21/4436* (2013.01); *G09G 2310/0281* (2013.01); *G09G 2330/021* (2013.01); *G09G 2340/0407* (2013.01); *G09G 2340/0442* (2013.01); *G09G 2340/0457* (2013.01)
USPC ........... 348/564; 348/445; 345/698; 345/204; 345/102

(58) Field of Classification Search
None
See application file for complete search history.

(56) References Cited

U.S. PATENT DOCUMENTS

2001/0050679 A1* 12/2001 Shigeta .......................... 345/204
2007/0070026 A1* 3/2007 Cho et al. ...................... 345/102
(Continued)

FOREIGN PATENT DOCUMENTS

| JP | 09-055909 A | 2/1997 |
| JP | 2001-356753 A | 12/2001 |

(Continued)

OTHER PUBLICATIONS

Official Communication issued in International Patent Application No. PCT/JP2011/080109, mailed on Feb. 21, 2012.

*Primary Examiner* — Jefferey Harold
*Assistant Examiner* — Sean Haiem
(74) *Attorney, Agent, or Firm* — Keating & Bennett, LLP

(57) ABSTRACT

The present display device is a display device in which a display unit is provided with a first area (MAR) that displays a first picture and a second area (SAR) that displays a second picture, and is equipped with a first illumination unit that illuminates the first area with light and a second illumination unit that illuminates the second area with light, wherein power supply to the first illumination unit and power supply to the second illumination unit are controlled separately. Thus, it is possible to reduce power consumption.

18 Claims, 17 Drawing Sheets

(56) References Cited

U.S. PATENT DOCUMENTS

| | | | |
|---|---|---|---|
| 2008/0036907 A1* | 2/2008 | Umei et al. | 348/445 |
| 2008/0150709 A1 | 6/2008 | Yamamoto et al. | |
| 2008/0284714 A1* | 11/2008 | Wu et al. | 345/102 |
| 2009/0102765 A1* | 4/2009 | Kawahara | 345/87 |
| 2010/0110294 A1* | 5/2010 | Oka | 348/564 |
| 2010/0201713 A1* | 8/2010 | Lu | 345/660 |
| 2012/0092397 A1* | 4/2012 | DeLuca | 345/698 |

FOREIGN PATENT DOCUMENTS

| | | |
|---|---|---|
| JP | 2004-184937 A | 7/2004 |
| JP | 2008-042726 A | 2/2008 |
| JP | 4302764 B2 | 7/2009 |
| JP | 2010-186156 A | 8/2010 |

* cited by examiner

DISPLAY DEVICE AND TELEVISION RECEIVER

TECHNICAL FIELD

The present invention relates to a display device whose display is divided into multiple areas.

BACKGROUND ART

Some display devices display a main picture such as a TV broadcast in the center of a display, and display a sub picture such as a menu bar or gadgets at the periphery of the display. Meanwhile, PTL 1 discloses an instrument panel that displays a navigation picture on the left side of a display, and displays a speed meter picture on the right side of the display.

CITATION LIST

Patent Literature

PTL 1: Japanese Patent No. 4302764

SUMMARY OF INVENTION

Technical Problem

However, with a configuration that switches the entire display on or off as in the past, there is a problem in that wasted power consumption is produced when one wants to display only a main picture or only a sub picture.

An object of the present invention is to reduce power consumption in a display device.

Solution to Problem

The present display device is a display device in which a display is provided with a first area that displays a first picture and a second area that displays a second picture, and is equipped with a first illumination unit that illuminates the first area with light and a second illumination unit that illuminates the second area with light, wherein power supply to the first illumination unit and power supply to the second illumination unit are controlled separately.

According to the above configuration, it is possible suspend power supply to the first illumination unit when one desires to display only the second picture, for example, and thereby reduce power consumption in the display device.

Advantageous Effects of Invention

According to the present invention, it is possible to reduce power consumption in a display device that displays a main picture and a sub picture.

DESCRIPTION OF EMBODIMENTS

Exemplary embodiments of the present invention are described as follows using FIGS. 1 to 21. In the following description, aspect ratio is expressed as the horizontal (H) size versus the vertical (V) size (H:V), while resolution is expressed as the total number of effective pixels in the horizontal (H) direction by the total number of effective pixels in the vertical (V) direction (H×V).

Example 1

FIG. 1(a) is a schematic diagram illustrating a display of the present television receiver. As illustrated in FIG. 1(a), the present display is a horizontally extended rectangle with an aspect ratio of 21:9. A main area MAR is a horizontally extended rectangle with a resolution of 1920×1080 or greater and an aspect ratio of 16:9. A sub area SAR is a vertically extended rectangle (aspect ratio 5:9), and is arranged horizontally adjacent to the main area MAR. Note that in FIG. 1(a), an HDTV picture with a resolution of 1920×1080 and an aspect ratio of 16:9 (main picture) is displayed in the main area MAR without lowering the resolution, while also displaying a user interface picture (sub picture) in the sub area SAR.

Additionally, with the present television receiver, it is possible to turn on only the sub area SAR (see FIG. 1(b)), or turn on only the main area MAR (see FIG. 1(c)).

Figure 1:
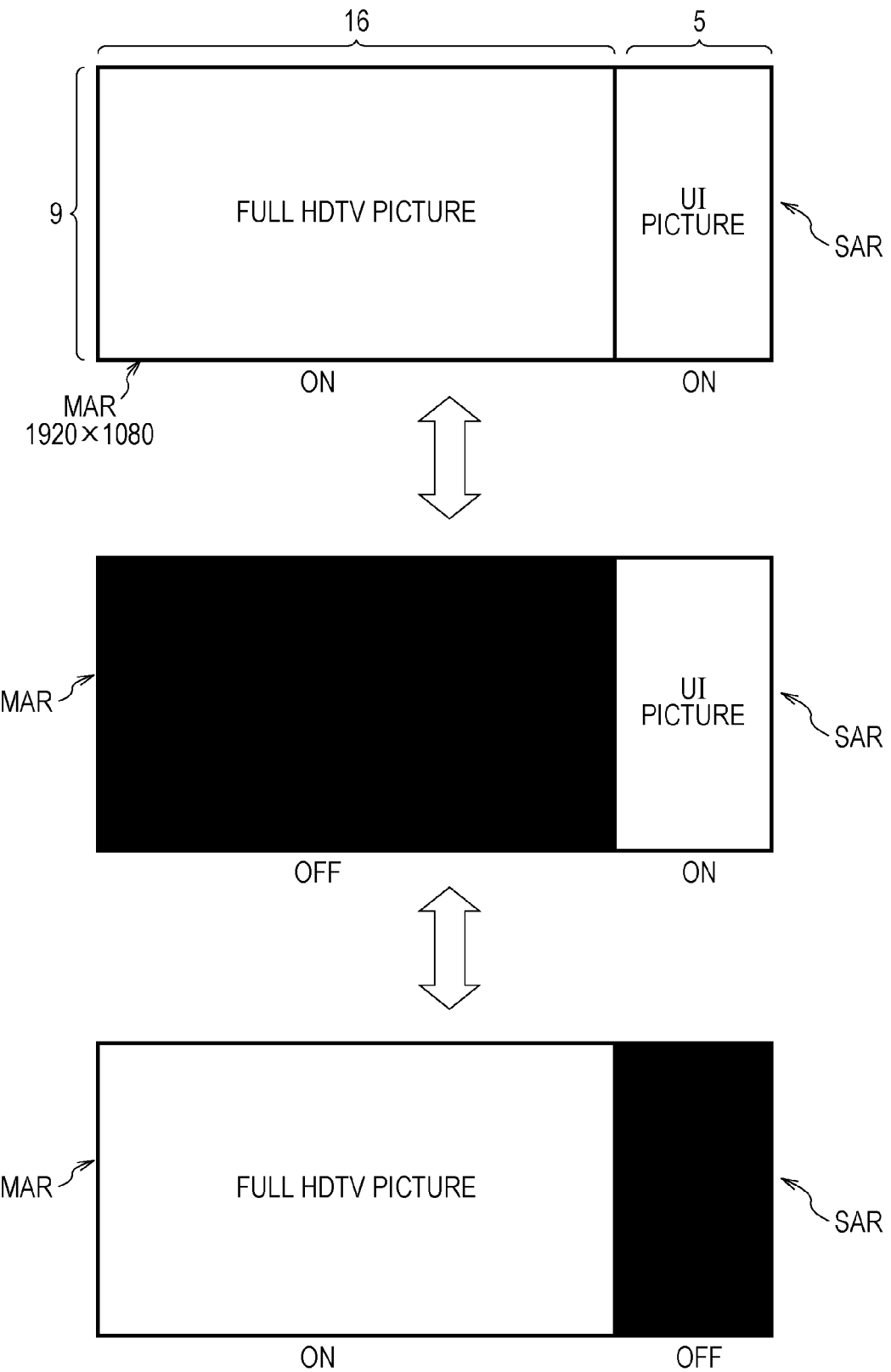
FIG. 1 is a schematic diagram illustrating an exemplary display on the television receiver in Example 1.
Figure 2:
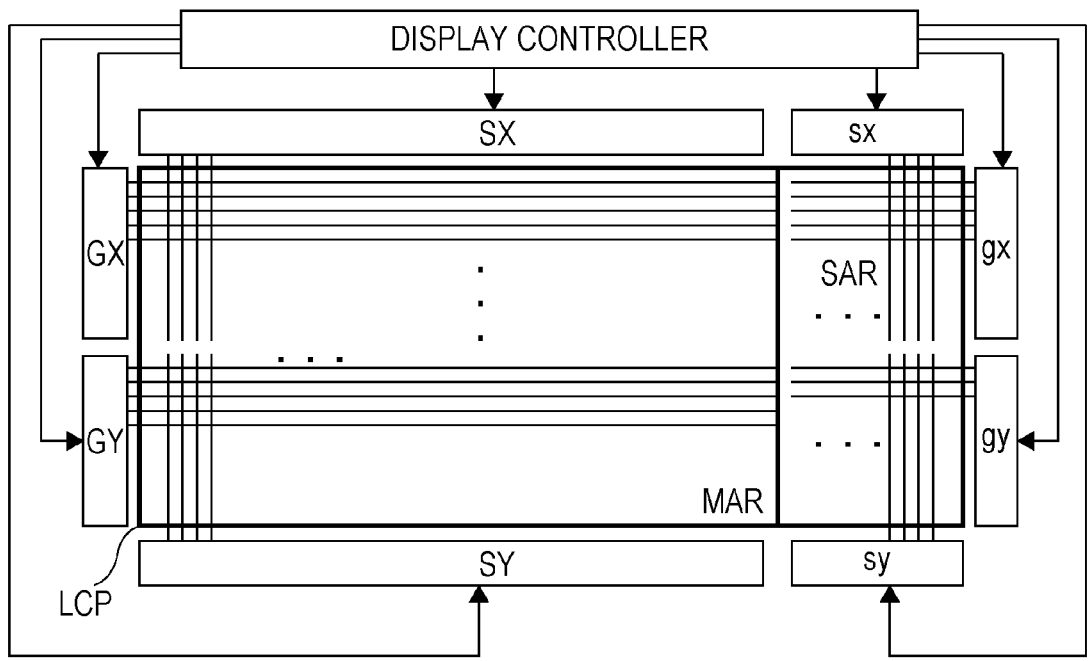
FIG. 2 is a schematic diagram illustrating part of the television receiver in Example 1 (the area around a liquid crystal panel).

FIG. 2 is an exemplary configuration of the area around a liquid crystal panel for realizing the display in FIG. 1. As illustrated in FIG. 2, in the main area MAR, the upstream part of each pixel column in the scanning direction (hereinafter, the upstream part) is provided with one data signal line, while in addition, the downstream part of each pixel column in the scanning direction (hereinafter, the downstream part) is provided with one data signal line (in other words, each pixel column is provided with two data signal lines). Also provided in the main area MAR are a first main gate driver GX that drives the scanning signal lines in the upstream part of the main area MAR, a first main source driver SX that drives the data signal lines in the upstream part of the main area MAR, a second main gate driver GY that drives the scanning signal lines in the downstream part of the main area MAR, and a second main source driver SY that drives the data signal lines in the downstream part of the main area MAR.

Meanwhile, as illustrated in FIG. 2, in the sub area SAR, the upstream part of each pixel column in the scanning direction (hereinafter, the upstream part) is provided with one data signal line, while in addition, the downstream part of each pixel column in the scanning direction (hereinafter, the downstream part) is provided with one data signal line (in other words, each pixel column is provided with two data signal lines). Also provided in the sub area SAR are a first sub gate driver gx that drives the scanning signal lines in the upstream part of the sub area MAR, a first sub source driver sx that drives the data signal lines in the upstream part of the sub area MAR, a second sub gate driver gy that drives the scanning signal lines in the downstream part of the sub area MAR, and a second sub source driver sy that drives the data signal lines in the downstream part of the sub area MAR.

Figure 3:
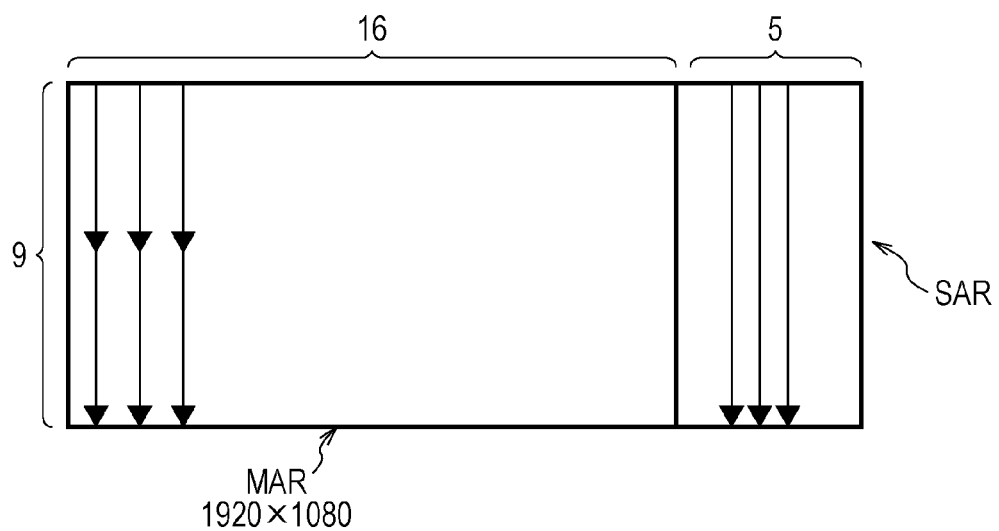
FIG. 3 is a schematic diagram illustrating a driving method when conducting the display in FIG. 1(a) with the configuration in FIG. 2.

With the present television receiver, when conducting the display in FIG. 1(a) with the configuration in FIG. 2 (displaying a main picture in the main area MAR, and displaying a sub picture in the sub area SAR), in the main area MAR, a scanning signal line in the downstream part is scanned in synchronization with a scanning signal line in the upstream part being scanned (dual source driving), as illustrated in FIG. 3. Meanwhile, in the sub area SAR, all scanning signal lines in the upstream part are successively (one at a time) scanned, and then all scanning signal lines in the downstream part are scanned (single-source driving).

Figure 4:
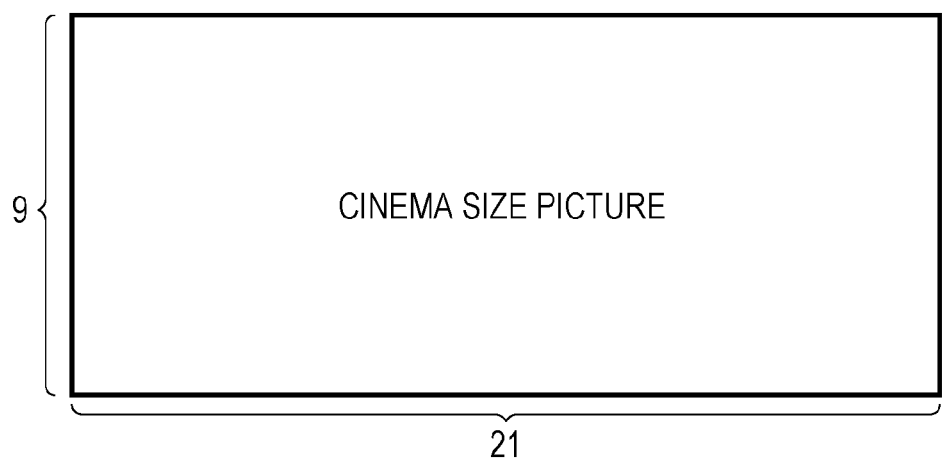
FIG. 4 is a schematic diagram illustrating another exemplary display on the television receiver in Example 1.
Figure 5:
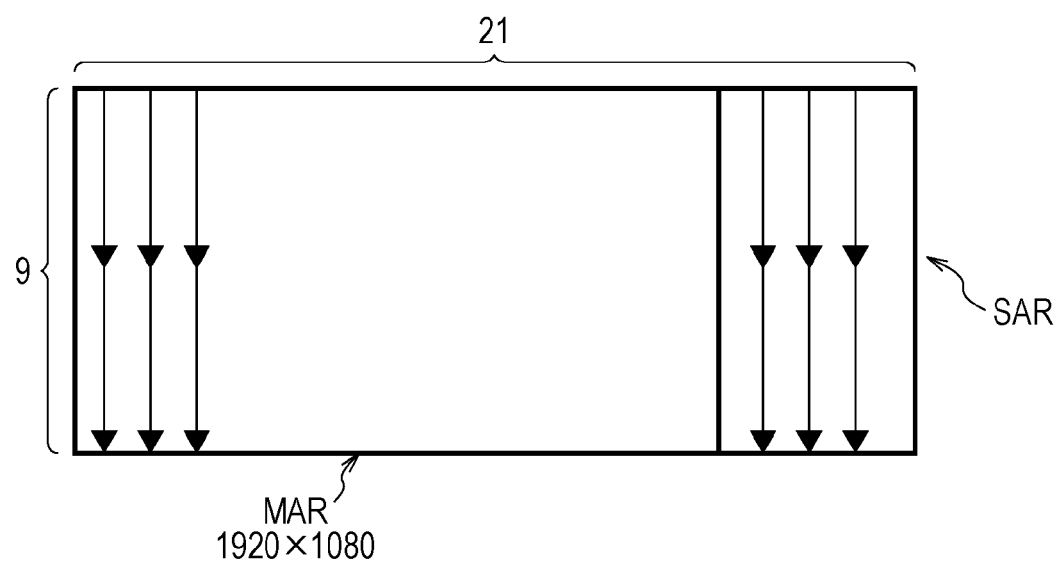
FIG. 5 is a schematic diagram illustrating a driving method when conducting the display in FIG. 4 with the configuration in FIG. 2.

Meanwhile, with the present television receiver, when conducting the display in FIG. 4 with the configuration in FIG. 2 (displaying the same picture, such as a cinema size picture, in the main area MAR and the sub area SAR), in the main area MAR, a scanning signal line in the downstream part is scanned in synchronization with a scanning signal line in the upstream part being scanned (dual source driving), as illustrated in FIG. 5. Additionally, in the sub area SAR, a scanning signal line in the downstream part is likewise scanned in synchronization with a scanning signal line in the upstream part being scanned (dual source driving).

Figure 6:
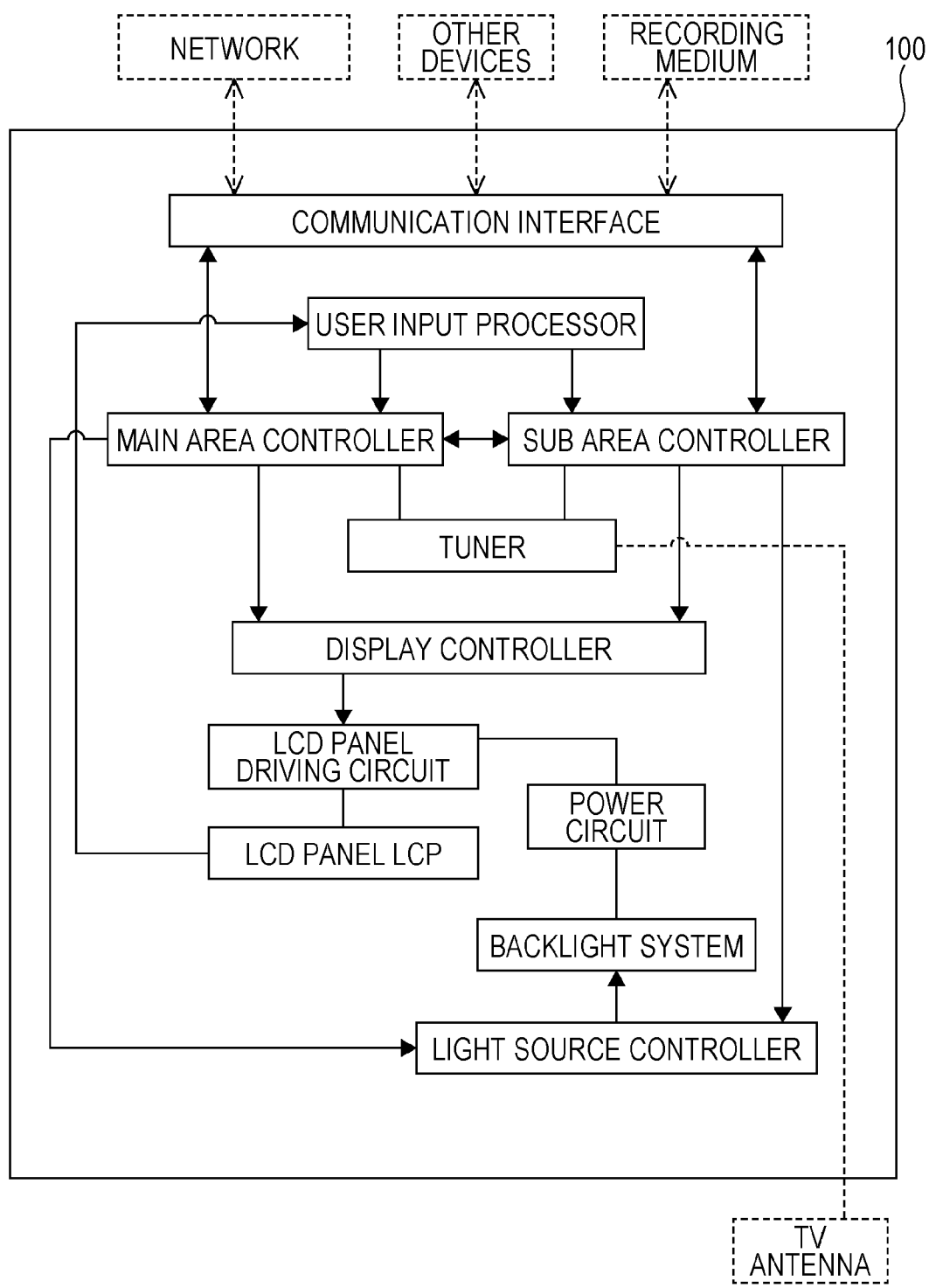
FIG. 6 is a schematic diagram illustrating an exemplary configuration of the television receiver in Example 1.
Figure 7:
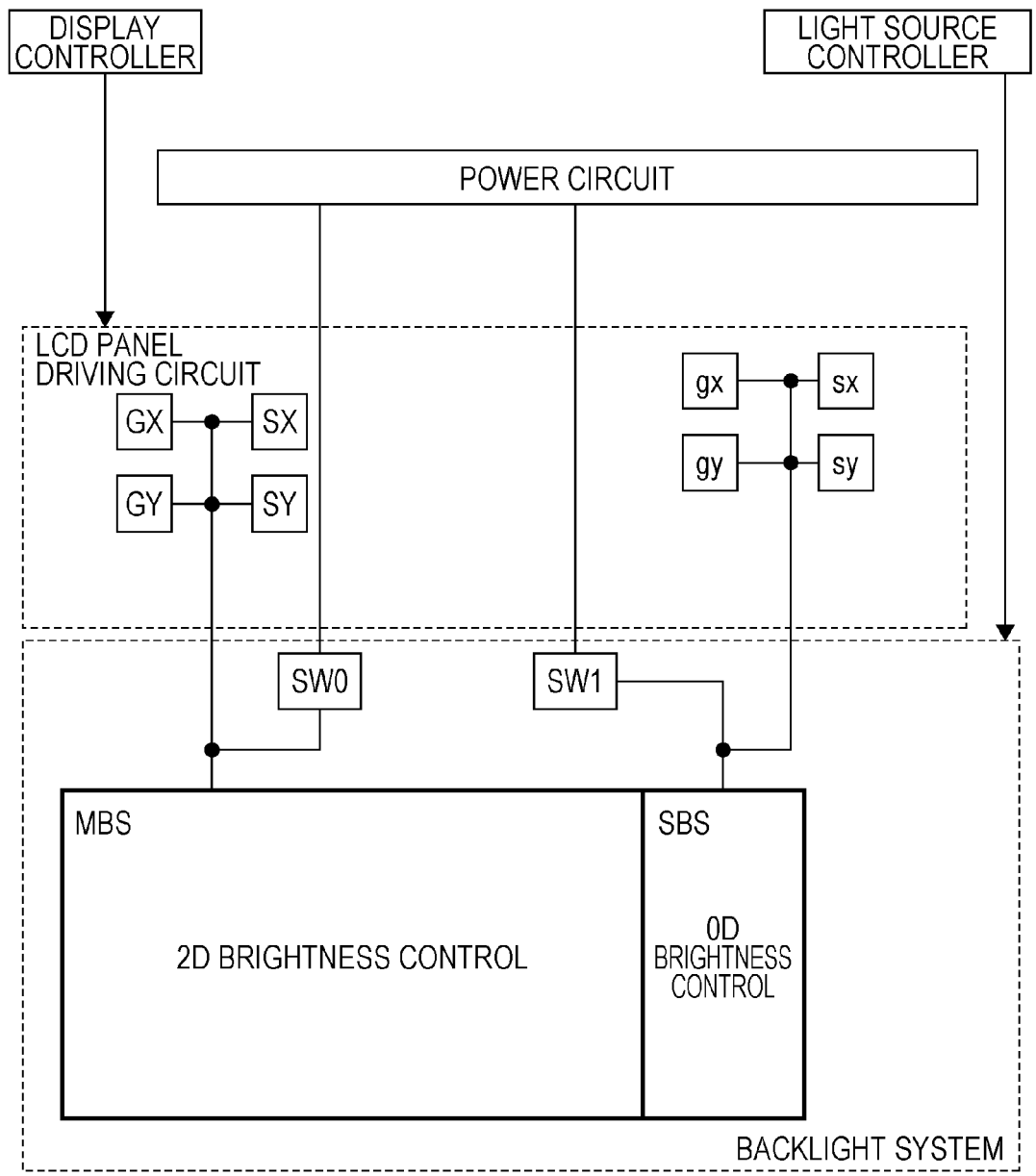
FIG. 7 is a schematic diagram illustrating an exemplary configuration of part of the television receiver in Example 1 (the area around a liquid crystal panel driving circuit and backlight system).
Figure 8:
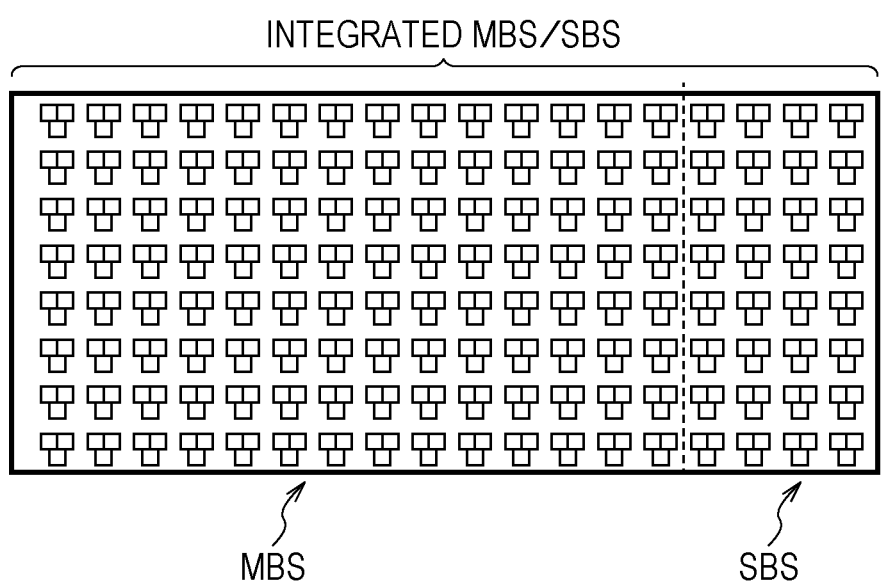
FIG. 8 is a schematic diagram illustrating an exemplary configuration of a main backlight unit and a sub backlight unit.

FIG. 6 is a schematic diagram illustrating a configuration of the present television receiver 100, while FIG. 7 is a schematic diagram illustrating an exemplary configuration of part of FIG. 6 (the area around a liquid crystal panel driving circuit and backlight system), and FIG. 8 is a schematic diagram illustrating an exemplary configuration of part of FIG. 6 (the area around a light source controller and backlight system).

As illustrated in FIG. 6, the present television receiver 100 is equipped with a liquid crystal panel (LCP) constituting a display, a liquid crystal panel driving circuit, a display controller, a tuner, a communication interface, a user input processor, a main area controller, a sub area processor, a light source controller, a backlight system, and a power circuit.

The liquid crystal panel LCP is equipped with 1080 or more scanning signal lines and 1920×4 (RGBY) or more data signal lines in the main area MAR. Note that a pixel in the main area MAR is a transmissive pixel made up of four horizontally arrayed subpixels (red, green, blue, yellow), while a pixel in the sub area SAR is a transmissive pixel made up of four horizontally arrayed subpixels (red, green, blue, white).

The user input processor processes user input, and outputs the processing results to the main area controller and the sub area controller. Note that in the case of providing a touch (proximity) sensor in the sub area SAR of the liquid crystal panel LCP, this touch (proximity) sensor is connected to the user input processor. The main area controller outputs main area picture data to the display controller and the light source controller according to processing results from the user input processor. The sub area controller outputs sub area picture data to the display controller and the light source controller according to processing results from the user input processor.

The display controller receives main area picture data and sub area picture data, and controls the liquid crystal panel driving circuit. Also, the light source controller receives main area picture data and sub area picture data, and controls the backlight system.

For example, when the user performs input for displaying an on-air HDTV picture in the main area MAR, the main area controller, having received processing results from the user input processor, acquires relevant HDTV picture data via the tuner, and outputs the acquired HDTV picture data to the display controller and the light source controller.

Also, when the user performs input for displaying an HDTV picture recorded on a recording medium (a hard disk, for example) in the main area MAR, the main area controller, having received processing results from the user input processor, acquires HDTV picture data recorded on a recording medium via the communication interface, and outputs the acquired HDTV picture data to the display controller and the light source controller.

Also, when the user performs input for displaying an HDTV picture on a network in the main area MAR, the main area controller, having received processing results from the user input processor, acquires HDTV picture data on a network via the communication interface, and outputs the acquired HDTV picture data to the display controller and the light source controller.

Also, when the user performs input for displaying an HDTV picture from a video camera in the main area MAR, the main area controller, having received processing results from the user input processor, acquires HDTV picture data from a video camera via the communication interface, and outputs the acquired HDTV picture data to the display controller and the light source controller.

Also, when the user performs input for displaying a Twitter picture in the sub area SAR, the sub area controller, having received processing results from the user input processor, acquires Twitter picture data on a network via the communication interface, and outputs the acquired Twitter picture data to the display controller and the light source controller.

Also, when the user performs input for displaying a videophone picture in the sub area SAR, the sub area controller, having received processing results from the user input processor, acquires videophone picture data from a videophone line via the communication interface, and outputs the acquired videophone picture data to the display controller and the light source controller.

Also, when the user performs input for displaying an on-air HDTV picture in the sub area SAR, the sub area controller, having received processing results from the user input processor, acquires relevant HDTV picture data via the tuner, and outputs the acquired HDTV picture data to the display controller and the light source controller.

The light source controller controls the backlight system as in FIG. 7. The backlight system is equipped with a main backlight unit MBS (first illumination unit) corresponding to the main area MAR, and a sub backlight unit SBS (second illumination unit) corresponding to the sub area SAR. The two portions are driven independently. More specifically, in the main backlight unit MBS, (multiple) LED elements, including LEDs for the three colors RGB, are arrayed in a matrix as in FIG. 8. Multiple LED elements are grouped together, and the brightness of each LED element is controlled on a per-group basis. Herein, one group is made to have four LED elements (two vertical by two horizontal), for example (2D brightness control). Meanwhile, in the sub backlight unit SBS, (multiple) LED elements, including LEDs for the three colors RGB, are arrayed in a matrix as in FIG. 8. Multiple LED elements are grouped together, and the brightness of each LED element is controlled on a per-group basis. Herein, one group is made to have all LED elements (in the sub backlight unit SBS), for example (OD brightness control).

Additionally, the light source controller separately switches the power of the main backlight unit MBS and the sub backlight unit SBS on/off, according to control signals from the main area controller and the sub area controller after receiving processing results from the user input processor. Namely, the main backlight unit MBS is connected to the power circuit via a switch SW0, while the sub backlight unit MBS is connected to the power circuit via a switch SW0. Then, the switch SW1 is switched on and the switch SW0 is switched off when turning on the sub area SAR only as in FIG. 1(b), whereas the switch SW0 is switched on and the switch SW1 is switched off when turning on the main area MAR only as in FIG. 1(c), for example.

Furthermore, regarding the two driver sets included in the liquid crystal panel driving circuit (GX-GY-SX-SY and gx-gy-sx-sy), the first main gate driver GX and the first main source driver SX as well as the second main gate driver GY and the second main source driver SY are connected to the power circuit via the switch SW0, while the first sub gate driver gx and the first sub source driver sx as well as the second sub gate driver gy and the second sub source driver sy are connected to the power circuit via the switch SW1. Consequently, when turning on the main area MAR only (switching on the switch SW0 only), for example, the first main gate driver GX and the first main source driver SX as well as the second main gate driver GY and the second main source driver SY only are connected to the power circuit, while all other drivers are disconnected from the power circuit. Meanwhile, when turning on the sub area SAR only (switching on the switch SW1 only), the first sub gate driver gx and the first sub source driver sx as well as the second sub gate driver gy and the second sub source driver sy only are connected to the power circuit, while all other drivers are disconnected from the power circuit.

Figure 9:
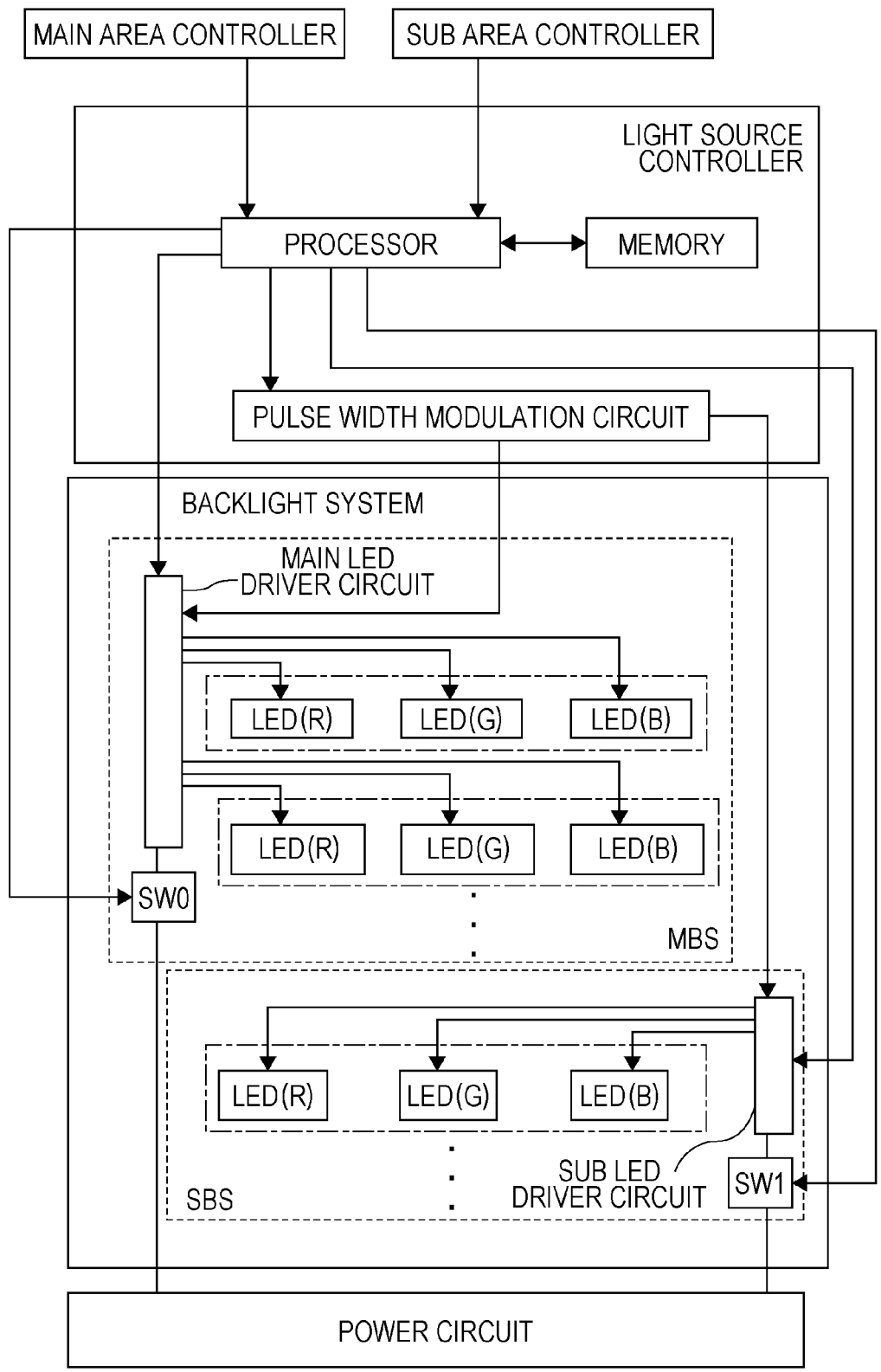
FIG. 9 is a schematic diagram illustrating an exemplary configuration of part of the television receiver in Example 1 (the area around a light source controller and backlight system).

FIG. 9 illustrates a specific example of a light source controller and a backlight system. As illustrated in FIG. 9, the light source controller includes a processor, memory, and a pulse width modulation circuit. The main backlight unit MBS of the backlight system is equipped with multiple LED elements (each LED element being made up of LEDs for the three colors RGB), a main LED driver circuit connected to these LED elements, and a (power) switch SW0. The sub backlight unit SBS of the backlight system is equipped with multiple LED elements (each LED element being made up of LEDs for the three colors RGB), a sub LED driver circuit connected to these LED elements, and a (power) switch SW1. Note that the main LED driver circuit is connected to the power circuit via the switch SW0, while the sub LED driver circuit is connected to the power circuit via the switch SW1.

Herein, the processor of the light source controller generates a timing signal for the main backlight on the basis of picture data for a main picture (first picture) received from the main area controller, and additionally, controls the pulse width modulation circuit. The timing signal for the main backlight, as well as a PWM signal for the main backlight generated by the pulse width modulation circuit, are input into the main LED driver circuit. Also, the processor of the light source controller generates a timing signal for the sub backlight on the basis of picture data for a sub picture (second picture) received from the sub area controller, and additionally, controls the pulse width modulation circuit. The timing signal for the sub backlight, as well as a PWM signal for the sub backlight generated by the pulse width modulation circuit, are input into the sub LED driver circuit. In addition, the processor of the light source controller respectively transmits an on signal or an off signal to the (power) switch SW0 and the (power) switch SW1, in response to control signals from the main area controller and the sub area controller after receiving processing results from the user input processor.

According to the present television receiver, it is possible to turn on the sub area SAR only (turning off the main area MAR), or turn on the main area MAR only (turning off the sub area SAR), in response to user instructions, and thereby reduce power consumption. This is also convenient at times such as when one is viewing the main picture and does not want the sub picture in one's visual field, or when continuously displaying a monitoring camera or clock picture in the sub area SAR.

Figure 10:
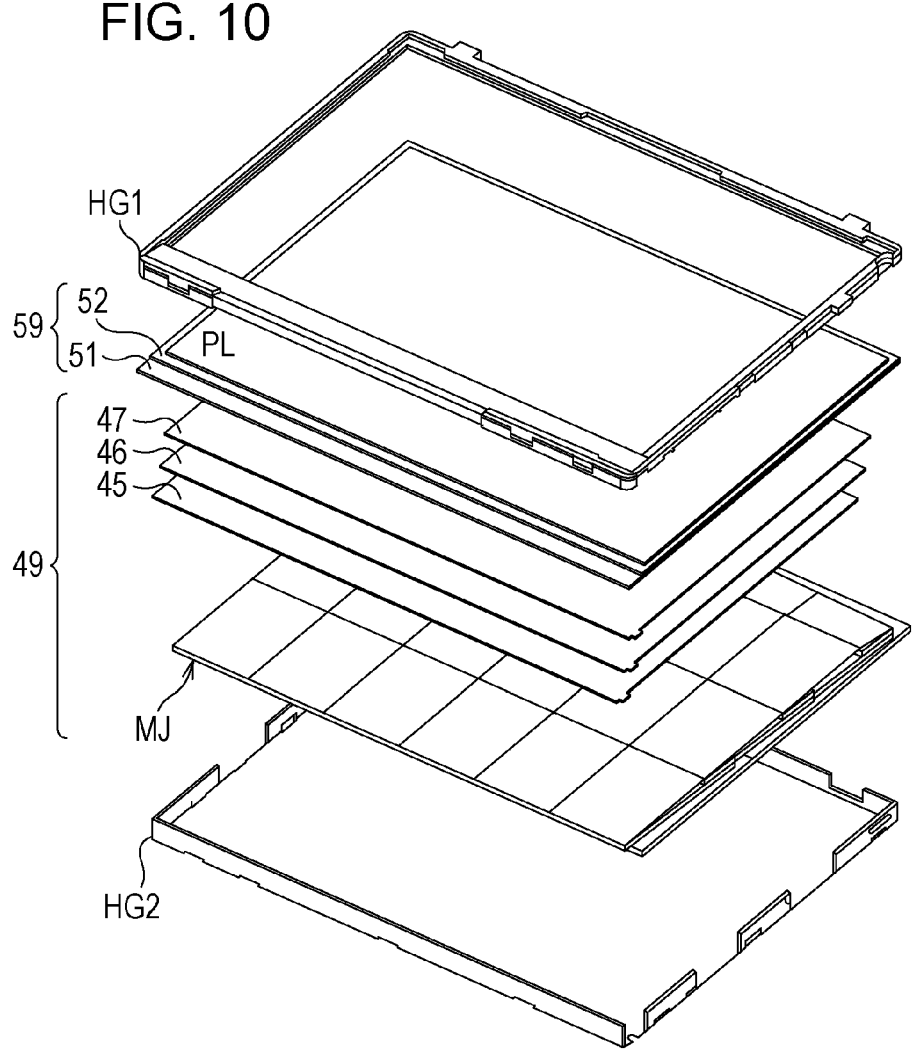
FIG. 10 is a schematic diagram illustrating exemplary storage of a liquid crystal panel and backlight system.

FIG. 10 illustrates an example of combining the backlight system and the liquid crystal panel LCP. The backlight system 49 and the liquid crystal panel 59 are internally housed stacked (such that the liquid crystal panel 59 is on the viewer side) between an upper housing HG1 and a lower housing HG2. In the liquid crystal panel 59, the liquid crystals are sealed by a sealing material attached to the outer edges of an active matrix substrate 51 and a facing substrate 52. Additionally, a polarizing film PL is provided so as to hold the active matrix substrate 51 and the facing substrate 52 therebetween. The backlight system 49 includes an LED module MJ provided with the main backlight unit MBS and the sub backlight unit SBS, a diffuser sheet 45, and prism sheets 46 and 47.

Figure 11:
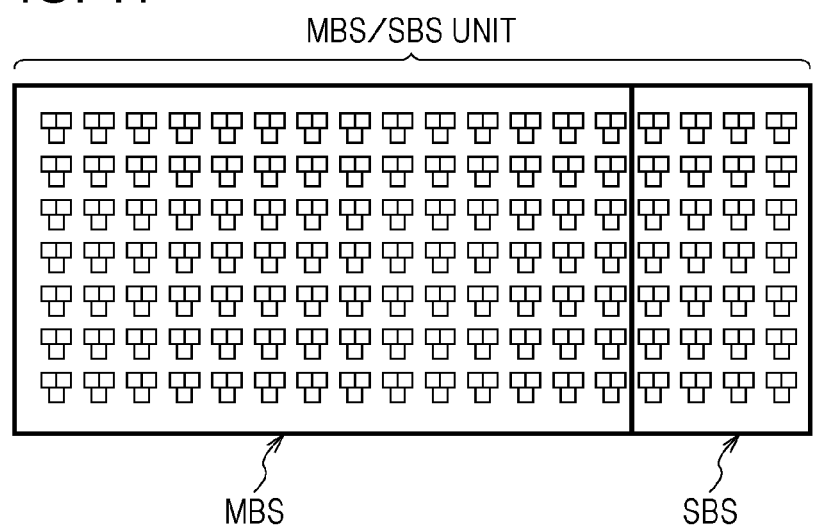
FIG. 11 is a schematic diagram illustrating another exemplary configuration of a main backlight unit and a sub backlight unit.
Figure 12:
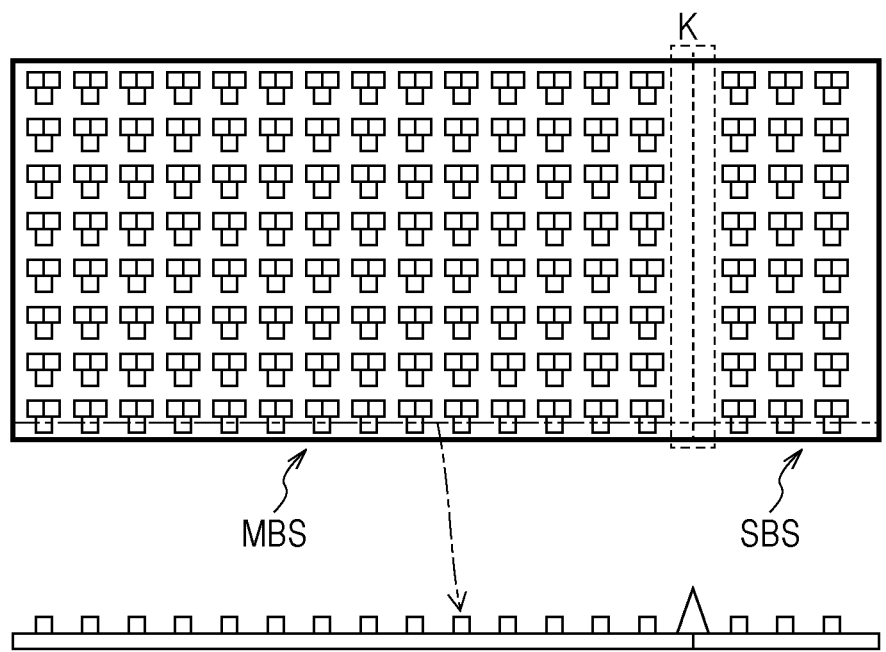
FIG. 12 is a schematic diagram illustrating yet another exemplary configuration of a main backlight unit and a sub backlight unit.

In the LED module MJ, the main backlight unit MBS and the sub backlight unit SBS may be integrally formed as illustrated in FIG. 8, or a separately formed main backlight unit MBS and sub backlight unit SBS may be joined (unitized) as illustrated in FIG. 11. A partition wall may also be formed at the boundary K between the main backlight unit MBS and the sub backlight unit SBS, as illustrated in FIG. 12. In so doing, light bleed at the boundary K (optical interference between the main area MAR and the sub area SAR) may be prevented, and the display quality may be improved.

Figure 13:
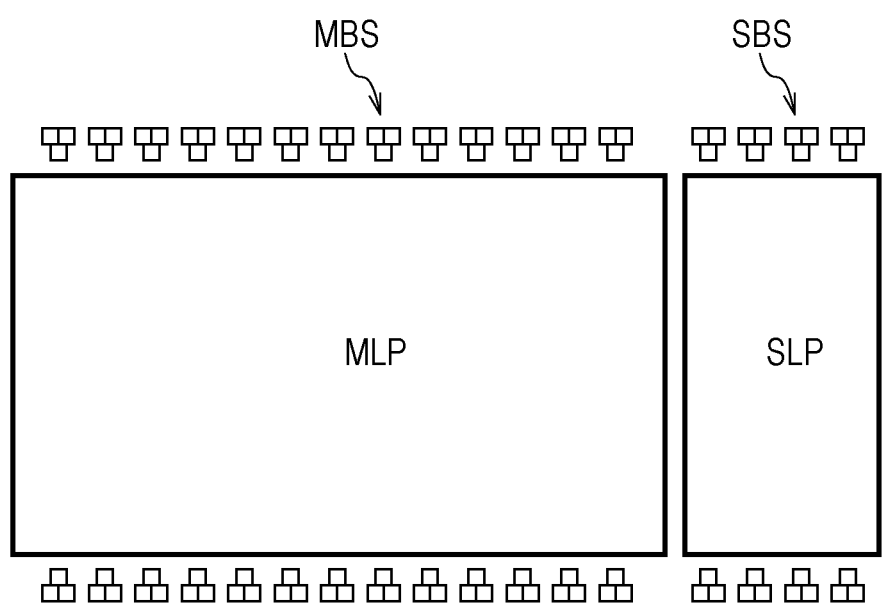
FIG. 13 is a schematic diagram illustrating yet another exemplary configuration of a main backlight unit and a sub backlight unit.

Furthermore, although the foregoing description describes the case of arraying LED elements in a matrix directly beneath the display (the main area MAR and the sub area SAR), the present invention is not limited thereto. As illustrated in FIG. 13, the main backlight unit MBS may be configured to include a main area light guide plate MLP and LED elements arranged at either edge thereof, while the sub backlight unit SBS may be configured to include a sub area light guide plate SLP and LED elements arranged at either edge thereof.

Figure 14:
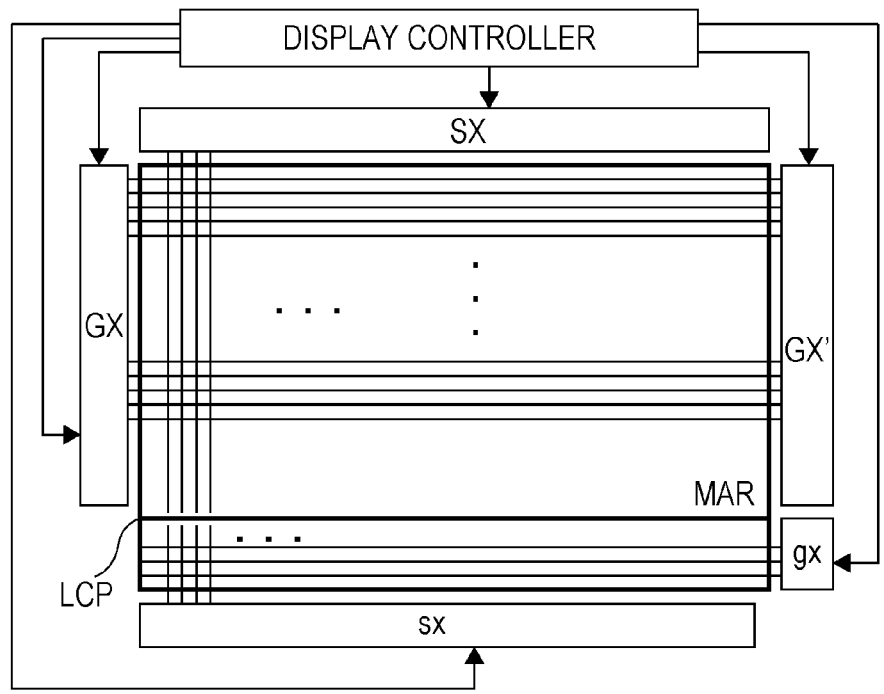
FIG. 14 is a schematic diagram illustrating an exemplary modification of FIG. 2.
Figure 15:
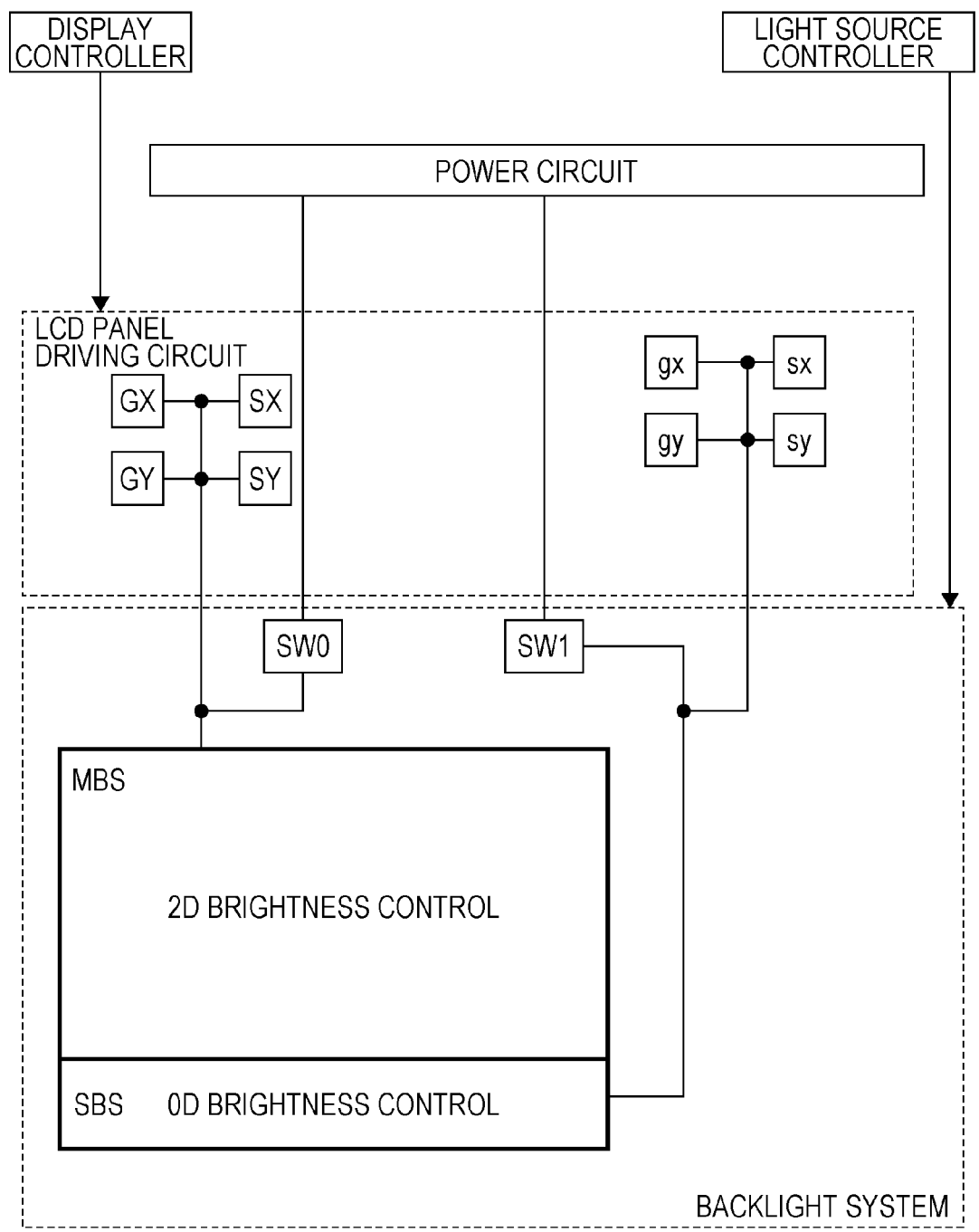
FIG. 15 is a schematic diagram illustrating an exemplary configuration of the area around a liquid crystal panel driving circuit and backlight system in the configuration of FIG. 14.

In FIG. 2, the sub area SAR is a vertically extended rectangle and arranged horizontally adjacent to the main area MAR, but is not limited thereto. As illustrated in FIG. 14, the sub area SAR may also be a horizontally extended rectangle and arranged vertically adjacent to the main area MAR. In this case, there may be provided main gate drivers GX and GX' that drive the scanning signal lines of the main area MAR from either side, a main source driver SX that drives the data signal lines of the main area MAR, a sub gate driver gx that drives the scanning signal lines of the sub area MAR, and a sub source driver sx that drives the data signal lines of the sub area MAR, without dividing the main area MAR and the sub area SAR into upper and lower divisions. Also, the area around the liquid crystal panel driving circuit and backlight system may be configured as illustrated in FIG. 15.

Example 2

In Example 1, each pixel in the main area MAR is transmissive, and each pixel in the sub area SAR is likewise transmissive. However, the present invention is not limited thereto. In the configuration in FIG. 2, each pixel in the main area MAR may be transmissive, while each pixel in the sub area SAR may be memory liquid crystals. Also, in the configuration in FIG. 2, each pixel in the main area MAR may be transmissive, while each pixel in the sub area SAR may be white/black transmissive (color filterless).

Figure 16:
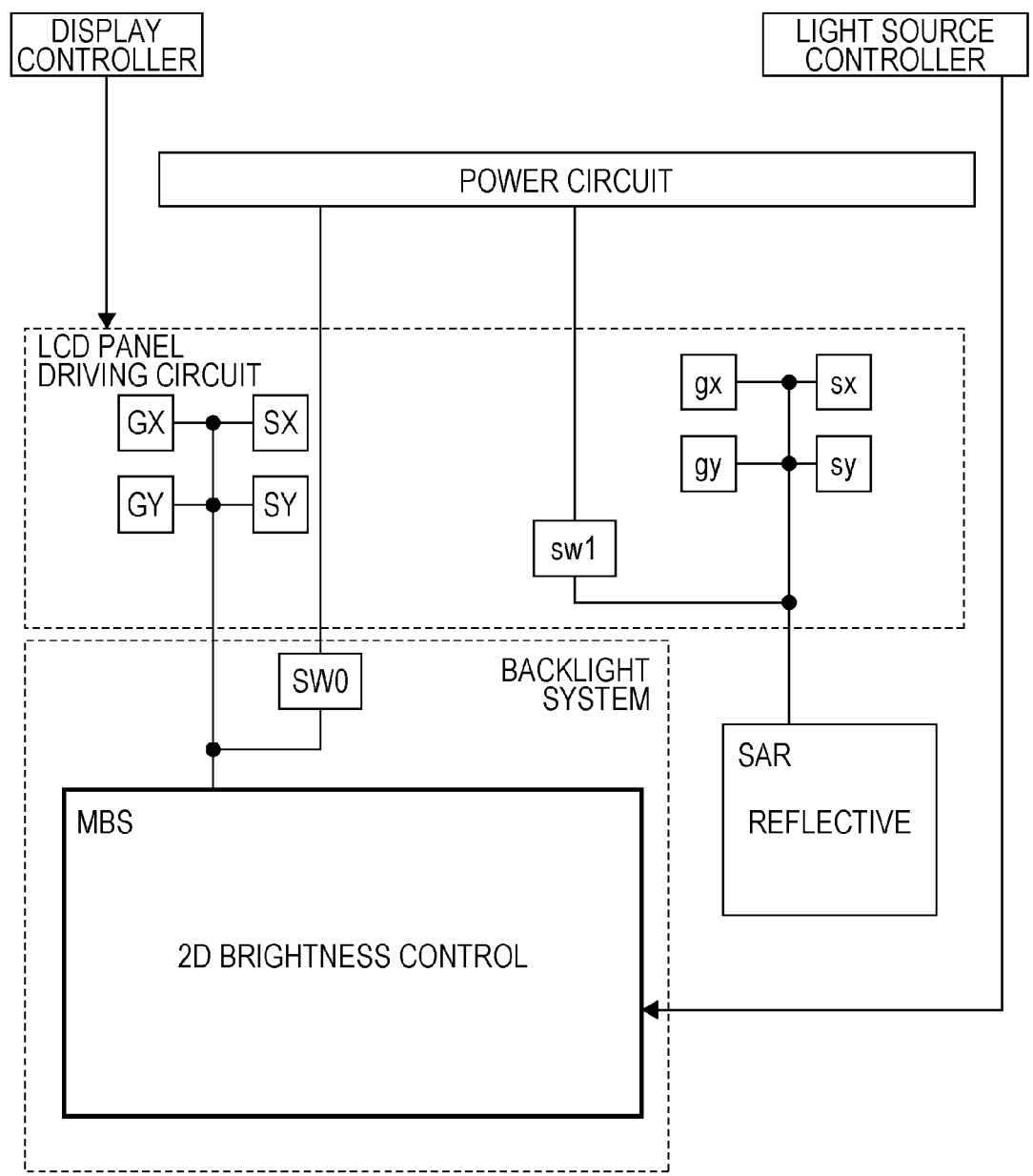
FIG. 16 is a schematic diagram illustrating an exemplary configuration of part of the television receiver in Example 2 (the area around a liquid crystal panel driving circuit and backlight system).

Furthermore, in the configuration in FIG. 2, each pixel in the main area MAR may be transmissive, while each pixel in the sub area SAR may be reflective. FIG. 16 illustrates an exemplary configuration of the area around the LCD panel driving circuit and backlight system in this case. In FIG. 16, the backlight system is made up of the main backlight unit MBS only. The main backlight unit MBS is connected to the power circuit via the switch SW0, while the first sub gate driver gx and the first sub source driver sx as well as the second sub gate driver gy and the second sub source driver sy are connected to the power circuit via a switch SW1 disposed inside the liquid crystal panel driving circuit. Note that the first main gate driver GX and the first main source driver SX as well as the second main gate driver GY and the second main source driver SY are also connected to the power circuit via the switch SW0.

Figure 17:
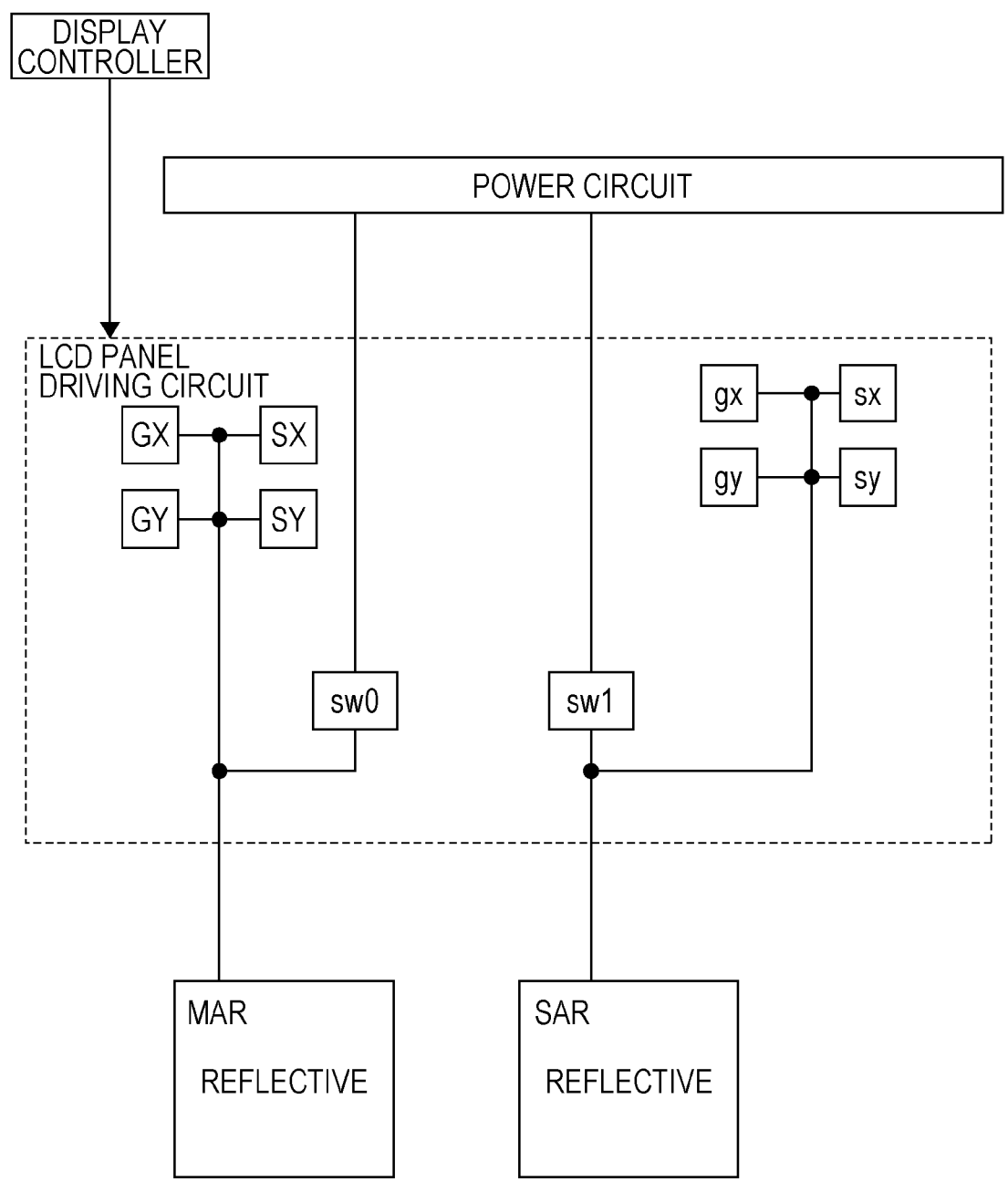
FIG. 17 is a schematic diagram illustrating another exemplary configuration of part of the television receiver in Example 2 (the area around a liquid crystal panel driving circuit and backlight system).

Also, in the configuration in FIG. 2, each pixel in the main area MAR may be reflective, while each pixel in the sub area SAR may also be reflective. FIG. 17 illustrates an exemplary configuration of the area around the LCD panel driving circuit and backlight system in this case. In FIG. 17, a backlight system is not provided. The first main gate driver GX and the first main source driver SX as well as the second main gate driver GY and the second main source driver SY are connected to the power circuit via a switch sw0 disposed inside the liquid crystal panel driving circuit. The first sub gate driver gx and the first sub source driver sx as well as the second sub gate driver gy and the second sub source driver sy are connected to the power circuit via a switch sw1 disposed inside the liquid crystal panel driving circuit.

Figure 18:
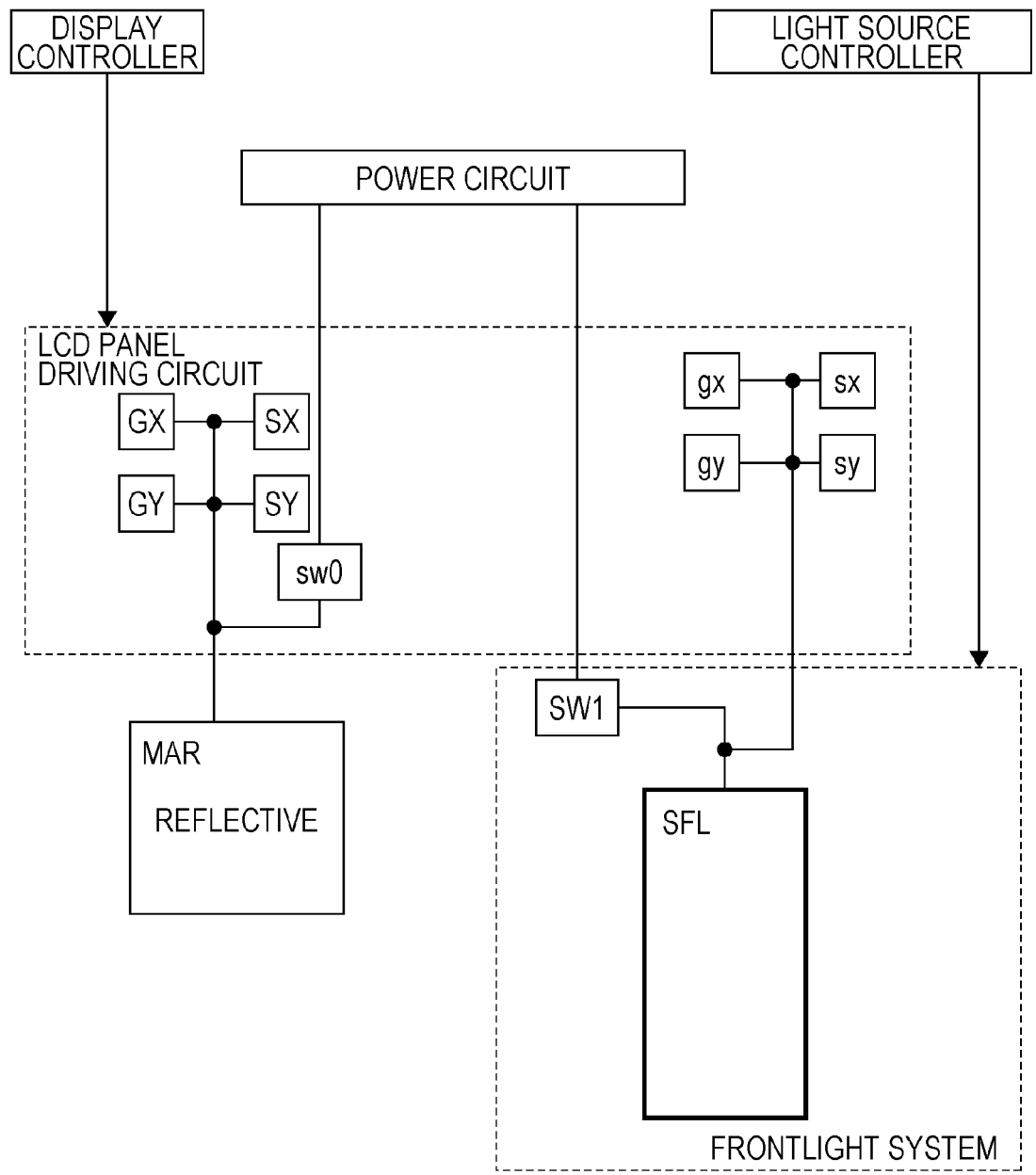
FIG. 18 is a schematic diagram illustrating yet another exemplary configuration of part of the television receiver in Example 2 (the area around a liquid crystal panel driving circuit and backlight system).

Note that in the configuration in FIG. 2, each pixel in the main area MAR may be reflective, while each pixel in the sub area SAR may be frontlight reflective. FIG. 18 illustrates an exemplary configuration of the area around the LCD panel driving circuit and backlight system in this case. In FIG. 18, a frontlight system including a sub front unit SFS is provided. The first main gate driver GX and the first main source driver SX as well as the second main gate driver GY and the second main source driver SY are connected to the power circuit via a switch sw0 disposed inside the liquid crystal panel driving circuit. The sub front unit SFS is connected to the power circuit via a switch SW1 disposed inside the frontlight system. Additionally, the first sub gate driver gx and the first sub source driver sx as well as the second sub gate driver gy and the second sub source driver sy are also connected to the power circuit via the switch SW1.

Figure 19:
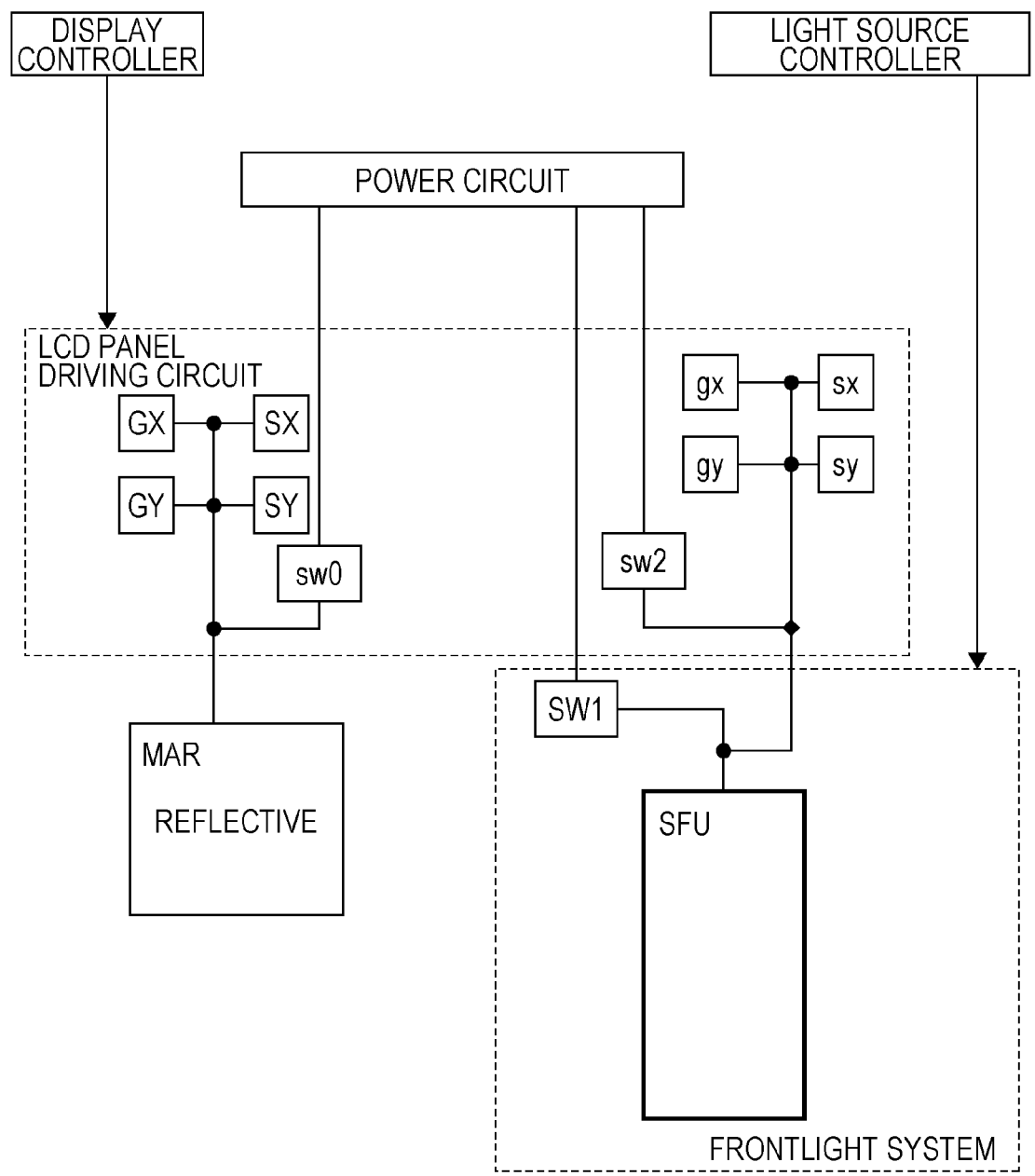
FIG. 19 is a schematic diagram illustrating an exemplary modification of FIG. 18.

The configuration in FIG. 18 may also be modified as illustrated in FIG. 19. In FIG. 19, the sub front unit SFS is connected to the power circuit via a switch SW1 disposed inside the frontlight system, while the first sub gate driver gx and the first sub source driver sx as well as the second sub gate driver gy and the second sub source driver sy are connected to the power circuit via a switch sw2 disposed inside the liquid crystal panel driving circuit. In so doing, display may be conducted in the sub area SAR while the frontlight system is turned off in cases of strong outside light or the like.

Example 3

Figure 20:
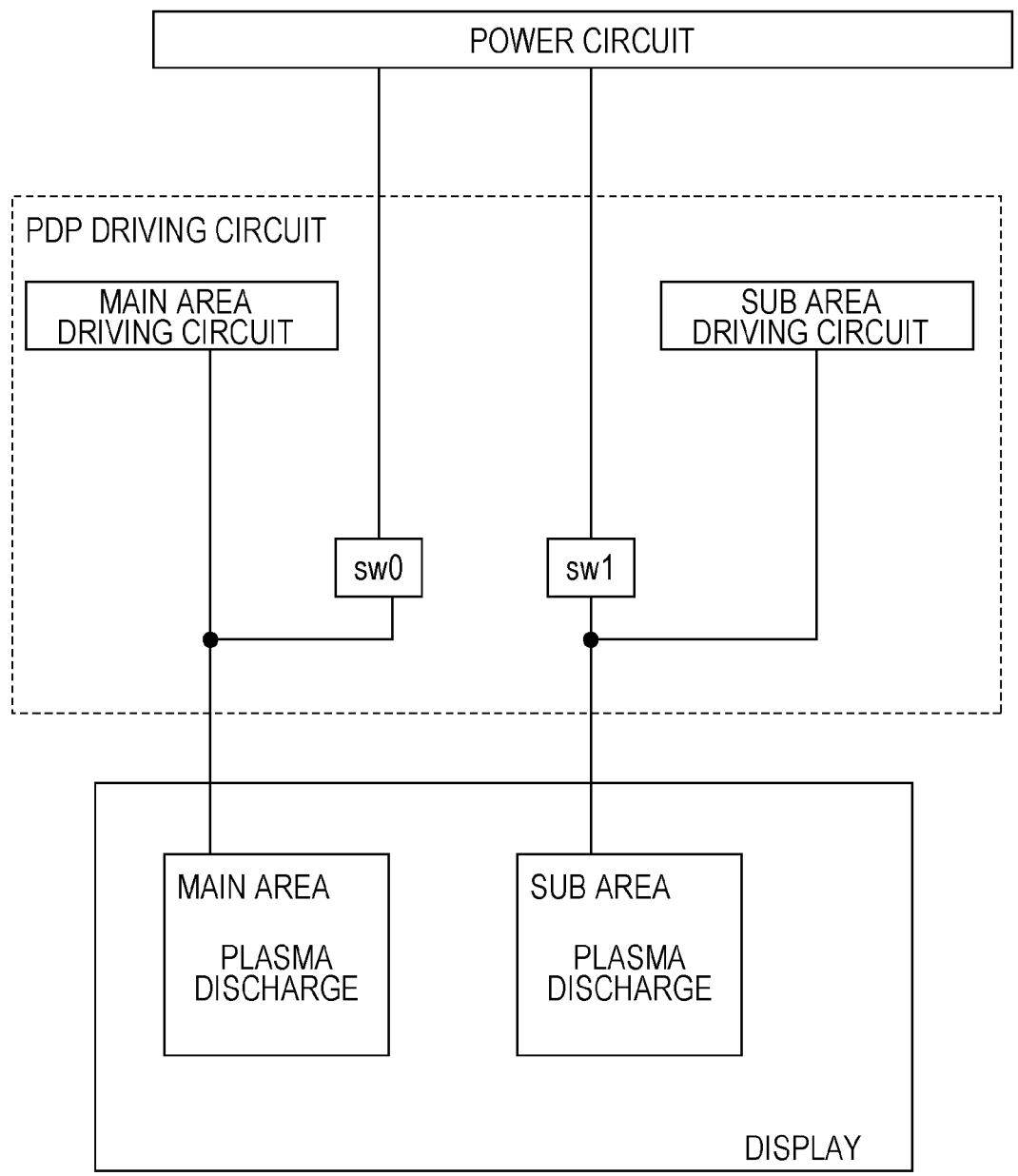
FIG. 20 is a schematic diagram illustrating an exemplary configuration of part of the display device in Example 3 (a PDP driving circuit).
Figure 21:
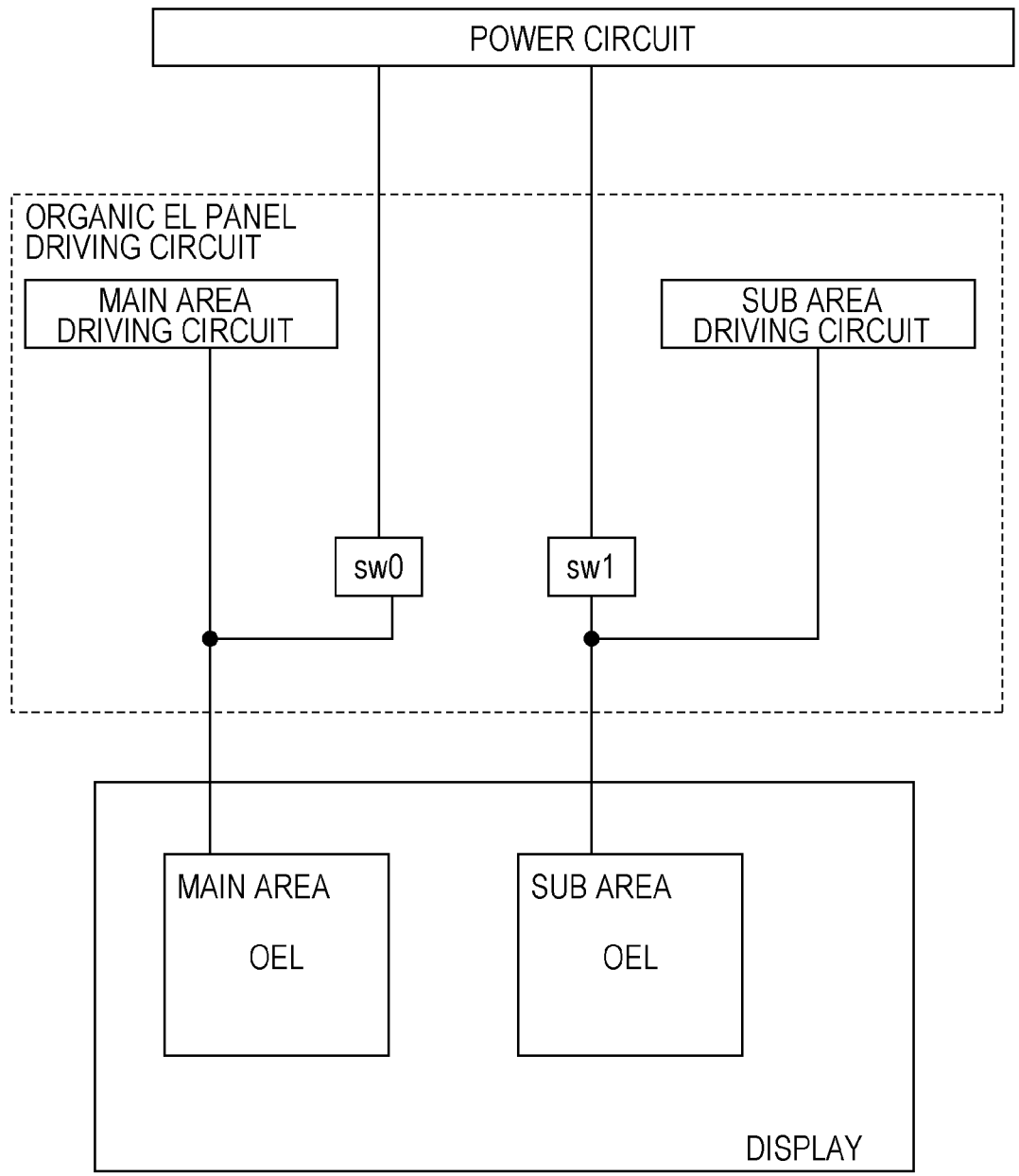
FIG. 21 is a schematic diagram illustrating an exemplary configuration of part of the display device in Example 3 (an organic EL driving circuit).

Although in Examples 1 and 2 the display is made up of a liquid crystal panel LCP, the configuration is not limited thereto. The display may also be made up of a self-illuminating plasma display panel (PDP). In this case, a main area driving circuit is connected to the power circuit via a switch sw0 disposed inside a PDP driving circuit, while a sub area driving circuit is connected to the power circuit via a switch sw1 disposed inside the PDP driving circuit, as illustrated in FIG. 20. Similarly, the display may also be made up of a self-illuminating organic EL panel. In this case, a main area driving circuit is connected to the power circuit via a switch sw0 disposed inside an organic EL panel driving circuit, while a sub area driving circuit is connected to the power circuit via a switch sw1 disposed inside the organic EL panel, as illustrated in FIG. 21.

The present display device is a display device in which a display unit is provided with a first area that displays a first picture and a second area that displays a second picture, and is equipped with a first illumination unit that illuminates the first area with light and a second illumination unit that illuminates the second area with light, wherein power supply to the first illumination unit and power supply to the second illumination unit are controlled separately.

According to the above configuration, it is possible suspend power supply to the first illumination unit when one desires to display only the second picture, for example, and thereby reduce power consumption in the display device.

The present display device may also be configured such that power is supplied to only one of the first and second illumination units according to user instructions.

The present display device is a display device in which a display is provided with a first area that displays a first picture and a second area that displays a second picture and is equipped with a first driving circuit that drives pixels in the first area and a second driving circuit that drives pixels in the second area with light, wherein power supply to the first driving circuit and power supply to the second driving circuit are controlled separately.

According to the above configuration, it is possible suspend power supply to the first driving circuit when one desires to display only the second picture, for example, and thereby reduce power consumption in the display device.

The present display device may also be configured such that power is supplied to only one of the first and second driving circuits according to user instructions.

The present display device may be additionally equipped with a first driving circuit that drives pixels in the first area, and may be configured such that power is also not supplied to the first driving circuit when not supplying power to the first illumination unit.

The present display device may be additionally equipped with a second driving circuit that drives pixels in the second area, and may be configured such that power is also not supplied to the second driving circuit when not supplying power to the second illumination unit.

The present display device may also be configured such that the first illumination is provided with a plurality of LED elements including one or more LEDs.

The present display device may also be configured such that the second illumination is provided with a plurality of LED elements including one or more LEDs.

The present display device may also be configured such that brightness control of each LED element is conducted on a per-group basis according to the first picture, taking a plurality of the LED elements as one group.

The present display device may also be configured such that brightness control of each LED element is conducted on a per-group basis according to the second picture, taking a plurality of the LED elements as one group.

The present display device may also be configured such that a partition wall is provided at the boundary of the first and second illumination units.

The present display device may also be configured such that the first and second illumination units are integrally formed.

The present display device may also be configured such that separately formed first and second illumination units are unitized.

The present display device may also be configured such that the first area is rectangular, with 1920 or more pixels arranged on the long edge, and 1080 or more pixels arranged on the short edge.

The present display device may also be configured such that the main area is rectangular, and the ratio of the size of the long edge versus the size of short edge is 16:9.

The present display device may also be configured such that the display is rectangular, and the ratio of the size of the long edge versus the size of the short edge is (16+a):9, where a is a positive number.

The present display device may also be configured such that the first picture is a picture having a resolution equal to or greater than a high-definition television broadcast (HDTV) resolution.

The present display device may also be configured such that the second picture is a user interface picture.

The present display device may also be configured such that the display is made up a liquid crystal panel.

The present television receiver is equipped with the above display device.

The present invention is not limited to the foregoing exemplary embodiments, and the embodiments of the present invention encompass configurations obtained by appropriately modifying or combining the foregoing exemplary embodiments on the basis of common general technical knowledge.

INDUSTRIAL APPLICABILITY

The present display device is suitable for a television receiver, for example.

REFERENCE SIGNS LIST 100 television receiver
MAR main area
SAR sub area
LCP liquid crystal panel
GX first main gate driver
SX first main source driver
GY second main gate driver
SY second main source driver
gx first sub gate driver
sx first sub source driver
gy second sub gate driver
sy second sub source driver
MBS main backlight unit
SBS sub backlight unit
SW0, SW1 switch

The invention claimed is:

1. A display device, comprising:
a display including a liquid crystal panel, a first illumination unit, and a second illumination unit; wherein
the first illumination unit and the second illumination unit are positioned at a back of the liquid crystal panel;
the display includes a first area that displays a first picture and a second area that displays a second picture;
the first illumination unit illuminates the first area with light;
the second illumination unit illuminates the second area with light;
power supply to the first illumination unit and power supply to the second illumination unit are controlled separately;
a partition wall is located at a boundary between the first and second illumination units;
a cross section of the partition wall has a triangular shape including two edges corresponding to two wall surfaces of the partition wall and an edge corresponding to a bottom face of the partition wall; and
the bottom face of the partition wall is positioned on a substrate of the first illumination unit and the second illumination unit.

2. The display device according to claim 1, wherein power is supplied to only one of the first and second illumination units according to user instructions.

3. A display device, comprising:
a display including a liquid crystal panel, a first driving circuit, a second driving circuit, a first illumination unit, and a second illumination unit; wherein
the first illumination unit and the second illumination unit are positioned at a back of the liquid crystal panel;
the display includes a first area that displays a first picture and a second area that displays a second picture;
the first driving circuit drives pixels in the first area; and the second driving circuit drives pixels in the second area;

the first illumination unit illuminates the first area with light;

the second illumination unit illuminates the second area with light;

power supply to the first driving circuit and power supply to the second driving circuit are controlled separately;

a partition wall is located at a boundary between the first and second illumination units;

a cross section of the partition wall has a triangular shape including two edges corresponding to two wall surfaces of the partition wall and an edge corresponding to a bottom face of the partition wall; and the bottom face of the partition wall is positioned on a substrate of the first illumination unit and the second illumination unit.

4. The display device according to claim 3, wherein power is supplied to only one of the first and second driving circuits according to user instructions.

5. The display device according to claim 2, further comprising:

a first driving circuit that drives pixels in the first area;

wherein power is also not supplied to the first driving circuit when not supplying power to the first illumination unit.

6. The display device according to claim 2, further comprising:

a second driving circuit that drives pixels in the second area;

wherein power is also not supplied to the second driving circuit when not supplying power to the second illumination unit.

7. The display device according to claim 1, wherein the first illumination is provided with a plurality of LED elements including one or more LEDs.

8. The display device according to claim 1, wherein the second illumination is provided with a plurality of LED elements including one or more LEDs.

9. The display device according to claim 7, wherein brightness control of each LED element is conducted on a per-group basis according to the first picture, taking a plurality of the LED elements as one group.

10. The display device according to claim 8, wherein brightness control of each LED element is conducted on a per-group basis according to the second picture, taking a plurality of the LED elements as one group.

11. The display device according to claim 1, wherein the first and second illumination units are integrally formed.

12. The display device according to claim 1, wherein separately formed first and second illumination units are unitized.

13. The display device according to claim 1, wherein the first area is rectangular, with 1920 or more pixels arranged on the long edge, and 1080 or more pixels arranged on the short edge.

14. The display device according to claim 1, wherein the main area is rectangular, and the ratio of the size of the long edge versus the size of short edge is 16:9.

15. The display device according to claim 14, wherein the display is rectangular, and the ratio of the size of the long edge versus the size of the short edge is (16+a):9, where a is a positive number.

16. The display device according to claim 1, wherein the first picture is a picture having a resolution equal to or greater than a high-definition television broadcast (HDTV) resolution.

17. The display device according to claim 1, wherein the second picture is a user interface picture.

18. A television receiver comprising:

the display device according to claim 1.

* * * * *